US008527372B2

(12) United States Patent  
Sanville et al.

(10) Patent No.: US 8,527,372 B2  
(45) Date of Patent: Sep. 3, 2013

(54) MONITORING AND CONTROLLING PROCESSES AT A VEHICLE WASH FACILITY

(75) Inventors: Katherine M. Sanville, White Bear Lake, MN (US); Ronald Bruce Howes, Jr., Minneapolis, MN (US); Scott Andrew Johansen, Minneapolis, MN (US)

(73) Assignee: ZEP IP Holding LLC, Atlanta, GA (US)

(*) Notice: Subject to any disclaimer, the term of this patent is extended or adjusted under 35 U.S.C. 154(b) by 794 days.

(21) Appl. No.: 11/906,526

(22) Filed: Oct. 2, 2007

(65) Prior Publication Data

US 2008/0046278 A1  Feb. 21, 2008

Related U.S. Application Data

(62) Division of application No. 10/427,033, filed on Apr. 29, 2003, now abandoned.

(51) Int. Cl.  
*G06Q 10/00*  (2012.01)

(52) U.S. Cl.  
USPC ............................................. 705/28

(58) Field of Classification Search  
USPC ................................. 705/1, 1.1, 28  
See application file for complete search history.

(56) References Cited

U.S. PATENT DOCUMENTS

| | | |
|---|---|---|
| 3,774,056 A | 11/1973 | Sample et al. |
| 4,241,400 A | 12/1980 | Kiefer |
| 4,482,785 A | 11/1984 | Finnegan et al. |
| 4,509,543 A | 4/1985 | Livingston et al. |
| 4,756,321 A | 7/1988 | Livingston et al. |
| 5,014,211 A | 5/1991 | Turner et al. |
| 5,038,807 A | 8/1991 | Bailey et al. |
| 5,043,860 A | 8/1991 | Koether et al. |
| 5,154,314 A | 10/1992 | Van Wormer |
| 5,168,445 A | 12/1992 | Kawashima et al. |
| 5,203,366 A | 4/1993 | Czeck et al. |
| 5,222,027 A | 6/1993 | Williams et al. |
| 5,272,638 A | 12/1993 | Martin et al. |
| 5,345,379 A | 9/1994 | Brous et al. |
| 5,351,725 A | 10/1994 | Suthergreen et al. |
| 5,390,385 A | 2/1995 | Beldham |
| 5,404,893 A | 4/1995 | Brady et al. |
| 5,556,478 A | 9/1996 | Brady et al. |
| 5,619,560 A | 4/1997 | Shea |
| 5,660,641 A | 8/1997 | Howe |
| 5,681,400 A | 10/1997 | Brady et al. |

(Continued)

OTHER PUBLICATIONS

Merriam Webster dictionary Monitoring definition.*

(Continued)

*Primary Examiner* — Heidi Kelley  
(74) *Attorney, Agent, or Firm* — Hunton & Williams LLP

(57) ABSTRACT

Remote monitoring of vehicle washing facilities allows a facility operator to more efficiently manage each site, particularly when combined with environmental conditions that influence the rate at which individual chemicals are used. Accurate chemical exhaustion times can therefore be predicted and communicated to the operator, and wash sequences and parameters may be altered in accordance with such environmental parameters. For example, information related to the composition of soil on a car may be monitored and used to alter the chemicals used in the wash cycle for that car. Other environmental conditions may include without limitation weather conditions, road conditions, types of vehicles, mechanical system status, vehicle temperature, etc.

29 Claims, 6 Drawing Sheets

(56) References Cited

U.S. PATENT DOCUMENTS

| | | |
|---|---|---|
| 5,694,323 A | 12/1997 | Koropitzer et al. |
| 5,724,261 A | 3/1998 | Denny et al. |
| 5,745,381 A | 4/1998 | Tanaka et al. |
| 5,757,664 A | 5/1998 | Rogers et al. |
| 5,758,313 A | 5/1998 | Shah et al. |
| H1743 H | 8/1998 | Graves et al. |
| 5,826,749 A | 10/1998 | Howland et al. |
| 5,839,097 A | 11/1998 | Klausner |
| 5,853,494 A | 12/1998 | Andersson |
| 5,875,430 A | 2/1999 | Koether |
| 5,939,974 A | 8/1999 | Heagle et al. |
| 5,945,910 A | 8/1999 | Gorra |
| 5,956,457 A | 9/1999 | Hirayama et al. |
| 5,956,487 A | 9/1999 | Venkatraman et al. |
| 5,967,202 A | 10/1999 | Mullen et al. |
| 5,973,696 A | 10/1999 | Agranat et al. |
| 5,975,352 A | 11/1999 | Spriggs et al. |
| 5,980,090 A | 11/1999 | Royal, Jr. et al. |
| 5,983,198 A | 11/1999 | Mowery et al. |
| 5,987,105 A | 11/1999 | Jenkins et al. |
| 6,003,070 A | 12/1999 | Frantz |
| 6,012,041 A | 1/2000 | Brewer et al. |
| 6,061,668 A | 5/2000 | Sharrow |
| 6,133,555 A | 10/2000 | Brenn |
| 6,259,956 B1 | 7/2001 | Myers et al. |
| 6,277,207 B1 | 8/2001 | Gauthier |
| 6,321,204 B1 | 11/2001 | Kazami et al. |
| 6,330,499 B1 | 12/2001 | Chou et al. |
| 6,336,362 B1 | 1/2002 | Duenas |
| 6,339,054 B1 | 1/2002 | Levitt et al. |
| 6,343,251 B1 | 1/2002 | Herron et al. |
| 6,356,205 B1 | 3/2002 | Salvo et al. |
| 6,357,292 B1 | 3/2002 | Schultz et al. |
| 6,377,868 B1 | 4/2002 | Gardner, Jr. |
| 6,510,384 B2 | 1/2003 | Okano |
| 6,609,101 B1 | 8/2003 | Landvater |
| 6,715,514 B2 | 4/2004 | Parker, III et al. |
| 6,718,216 B2 * | 4/2004 | Grier .............................. 700/90 |
| 6,792,395 B2 | 9/2004 | Roberts |
| 6,847,305 B1 | 1/2005 | Buck |
| 6,972,395 B2 | 12/2005 | Jones |
| 6,975,937 B1 | 12/2005 | Kantarjiev et al. |
| 7,045,021 B2 * | 5/2006 | Ewing et al. ..................... 134/29 |
| 7,069,188 B2 | 6/2006 | Roberts |
| 7,155,349 B1 | 12/2006 | Souluer |
| 7,177,825 B1 | 2/2007 | Borders et al. |
| 7,201,290 B2 | 4/2007 | Mehus et al. |
| 7,228,199 B2 | 6/2007 | Wallace |
| 7,292,993 B2 | 11/2007 | Uzzo et al. |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2002/0147124 A1 * | 10/2002 | Klos et al. ..................... 510/447 |
| 2003/0191558 A1 | 10/2003 | Arellano |
| 2003/0212602 A1 * | 11/2003 | Schaller .......................... 705/22 |
| 2004/0143368 A1 * | 7/2004 | May et al. ..................... 700/241 |
| 2004/0159342 A1 | 8/2004 | Ewing et al. |

OTHER PUBLICATIONS

*We'd like to make a couple of things perfectly CLEAR*, AQUABALANCE Pool and Spa Management, Ecolab brochure, 1998 Ecolab Inc., (4 pages).
*White Paper*, Ecolab Balancer. Com. MRE Jun. 4, 1997, (4 pages).
*Relax. We've Got Your Pool Concerns Under Control*, Ecolab Water Care Services, 1998 Ecolab, Inc., (4 pages).
Office Action dated Aug. 2, 2007 for U.S. Appl. No. 10/427,033, (6 pages).
McAfee et al., Professional Car care Online, "The 'Remote'-Control Carwash", Sep. 1996, (5 pages), http://www.carwash.com/ArticlePrint.asp?print=1&IndexID=4200908&UniqueURL=3378.
Bowie, Jr., Professional Car care Online, "Save Your Softener (and the Environment)", Feb. 1996, (5 pages), http://www.carwash.com/ArticlePrint.asp?print=1&IndexID=4200208&UniqueURL=3378.
"Discover the First Comprehensive Cleaning Program for Large Vehicles . . . ", brochure, TransClean, 1997, (2 pages).
Letter to Ecolab Inc. from TransClean, Inc. dated Nov. 3, 2008, (1 page).
Stewart, William Royce Jr., "New Algorithms for Deterministic and Stochastic Vehicle Routing Problems" University of Maryland, 1981, AAT 8202876, Abstract, 2 pp.
Fisher, Marshall et al., "A Computerized Vehicle Routing Application," Interfaces vol. 12, No. 4, Aug. 1982, pp. 42-52.
Golden, Bruce L. et al., "Computerized Vehicle Routing in the Soft Drink Industry," Operations Research, vol. 35, No. 1, Jan.-Feb. 1987, pp. 6-17.
Bodin, Lawrence, "Twenty Years of Routing and Scheduling," Operations Research, vol. 38, No. 4, Jul.-Aug. 1990, pp. 571-579.
ROADNET—Daily Route Editor Manual Roadnet Technologies Inc., 1996, 116 pp.
Bell, Walter J. et al., "Improving the Distribution of Industrial Gases with an On-Line Computerized Routing and Scheduling Optimizer," Interfaces vol. 13, No. 6, Dec. 1983, 21 pp.
Meyer, Christopher, "Chaos and the IS executive Computer World," May 1996, 7 pp.
Slywotzky, Adrian J., "Concrete Solution-Company Operations," The Industry Standard, Aug. 28, 2000, 4 pp.
Berman, Oded et al., "Deliveries in an Inventory/Routing Problem Using Stochastic Dynamic Programming," Transportation Science, vol. 35, No. 2, May 2001, 22 pp.
Herer, Yale T. et al., "The metered inventory routing problem, an integrative heuristic algorithm," International Journal Production Economics, vol. 51, 1997, 13 pp.
Dror, Moshe et al., Inventory Routing: Operational Design Journal of Business Logistics, vol. 9, No. 2, 1988, pp. 165-183.
Campbell, Melissa, Thesis: "Inventory Routing," Georgia Institute of Technology, Jul. 2000, 162 pp.
Campbell, M. and M. Savelsbergh, Inventory Routing in Practice, The Vehicle Routing Problem SIAM Monographs on Discrete Mathematics and Applications, 2002, (Inventory Routing in Practice, Mar. 1, 2000, 25 pages).

* cited by examiner

MONITORING AND CONTROLLING PROCESSES AT A VEHICLE WASH FACILITY

CROSS-REFERENCE TO RELATED APPLICATIONS

This application is a divisional of U.S. patent application Ser. No. 10/427,033, filed Apr. 29, 2003, the entire content of which is incorporated herein by reference.

TECHNICAL FIELD

The invention relates generally to monitoring and controlling remote facilities, and more particularly, to monitoring and controlling processes at remote vehicle wash facilities.

BACKGROUND OF THE INVENTION

In recent years, it has become common for gas stations to also provide a car wash on site. In many cases, a cashier is the only attendant at the gas station and, in an increasing number of cases, the gas station and associated car wash are completely automated—there is no attendant on site. In other cases, the car wash stands alone, without an associated gas station. In any case, current industry practice is to manage the associated vehicle wash facility through periodic physical inspections by specially trained technicians, or "jobbers." Jobbers are capable of safely handling the hazardous chemicals and of operating and repairing the increasingly complex equipment used in the modern vehicle wash facility. Jobbers, other technicians or attendants, and the owners of the car washes may represent "vehicle wash operators" and may operate wash facilities for a variety of vehicles, including cars, trucks, boats, tractors, etc.

In operation, a vehicle wash facility applies one or more chemicals to each vehicle that is to be washed at the facility. Prior to being applied to a vehicle, each chemical is diluted using water. Dilution may occur in a solution tank, from which a point-of-use dispenser pulls the chemical(s)-water combination for application to a vehicle. Alternatively, dilution may also occur as the chemical(s) and water are being dispensed at substantially the same time by a point-of-use dispenser to a vehicle. In either case, the actual solution applied to each vehicle includes a concentration of one or more chemicals and water. A responsibility typically reserved for a vehicle wash operator relates to defining the type and amount of appropriate chemicals, and thus, concentrations thereof, that are to be applied by a vehicle wash facility to the various vehicles utilizing the facility. Currently, vehicle wash operators base this determination on the geographical location of each vehicle wash facility that they service as well as local road conditions and the current season, i.e., autumn, winter, spring or summer. A single vehicle wash operator commonly manages multiple vehicle wash facilities at various locations within a certain geographical area or region. This approach allows vehicle wash operators to profit from the economies of scale by reaping a better return on investment respective to the number of personnel and amount of specialized training required for the personnel.

However, problems arise in that this approach necessarily lengthens the period in time between service visits to a specific wash facility by a vehicle wash operator. As such, it would not be efficient in the current approach for the vehicle wash operator to take into account various factors that otherwise would be useful in determining the appropriate chemicals for use by the facility. Such factors may include, for example, a current weather pattern or actual conditions over a given period in time, the type of vehicles that use the vehicle wash facility and actual conditions of each vehicle.

In addition to the problems described in the preceding paragraph, the physical inspection method of managing more than one vehicle wash facility is inherently inefficient with respect to equipment maintenance and the management of chemical inventory. Not long after a vehicle wash operator leaves a facility, the information gathered during the physical inspection is no longer timely. If the facility unexpectedly develops a problem, such as, for example, failing to adhere to a regulatory specification, running out of a chemical or having a mechanical failure, the problem will not be detected until the next inspection or until customers complain.

SUMMARY OF THE INVENTION

The present invention solves these and other problems by an automated system for monitoring and controlling the chemical and mechanical systems and processes at a vehicle wash facility. Automated monitoring and controlling of processes and systems at a vehicle wash facility provides the facility the ability to maximize cleaning processes for vehicles that utilize the facility, particularly when combined with environmental conditions that influence the rate at which individual chemicals are used. For example, the composition of soil on a car may be monitored and used to alter the chemicals used in the wash cycle for that car. Other environmental conditions may include, without limitation, weather conditions, types of vehicles, mechanical system status, vehicle temperature, etc. Moreover, accurate chemical exhaustion times can therefore be predicted and communicated to the facility operator, and wash sequences and parameters may be altered in accordance with such environmental parameters.

An embodiment of the present invention is a computer-implemented method for managing a process operating at a vehicle wash facility. The method includes monitoring an environmental parameter that influences application of a chemical being applied to one or more vehicles being washed in the wash facility during the process. Application of the chemical to the one or more vehicles is automatically controlled based on the monitored environmental parameter. Examples of environmental parameters are composition of soil on one or more vehicles washed during the process, weather conditions in proximity to the vehicle wash facility and the temperature of one or more vehicles washed during the process. Based on at least one environmental parameter, the method may select a first chemical instead of a second chemical for application to the one or more vehicles or alter the amount and/or temperature of water applied with the selected chemical to provide a more optimal wash for the vehicle(s). The method may further include steps of monitoring a current quantity of the chemical available for use at the vehicle wash facility and predicting a time point indicating expected exhaustion of the chemical. Said prediction is based on the monitored current quantity and the monitored environmental parameter. A notification based on predicted time point may be provided to a remote management facility over a communications network, thereby enabling the chemical to be replenished in an efficient manner.

An embodiment of the present invention is a method of managing a process operating at a vehicle wash facility that is communicatively coupled to a remote management facility, the process using at least one chemical. The method includes the steps of monitoring an environmental parameter that influences a usage rate chemical in the process; monitoring a current quantity of the chemical available for use at the vehicle wash facility in the process; predicting a time point indicating expected exhaustion of the chemical based on the environmental parameter and the current quantity of the chemical; and providing a notification of the time point through the remote management facility.

Another embodiment of the present invention is a system for managing a process operating at a vehicle wash facility that is communicatively coupled to a remote management facility, the process using at least one chemical. The system includes an environmental detector monitoring an environmental parameter that influences a usage rate of the chemical in the process; a chemical quantity detector monitoring a current quantity of the chemical available for use at the vehicle wash facility in the process; a controller predicting a time point indicating expected exhaustion of the chemical based on the environmental parameter and the current quantity of the chemical; and a communications device providing a notification of the time point through the remote management facility.

In implementations of the present invention, articles of manufacture are provided as computer program products. One embodiment of a computer program product provides a computer program storage medium, or alternatively, a non-volatile solid state memory device, readable by a computer system and encoding a computer program that manages a chemical process at a vehicle wash facility that is communicatively coupled to a remote management facility. The computer process includes monitoring an environmental parameter that influences application of a chemical being applied to one or more vehicles being washed in the wash facility during the process. The computer process further includes automatically controlling application of the chemical to the one or more vehicles based on the monitored environmental parameter. In an embodiment, the environmental parameter influences a usage rate of the chemical in the process. In this embodiment, the computer process includes monitoring a current quantity of the chemical available for use at the vehicle wash facility in the process; predicting a time point indicating expected exhaustion of the chemical based on the environmental parameter and the current quantity of the chemical; and providing a notification of the time point through the remote management facility.

Another embodiment is a system for managing a chemical process at a vehicle wash facility that is communicatively coupled to a remote management facility. The system includes a monitoring device monitoring the chemical process and reporting process data to a controller; a control device controlling the chemical process in response to commands received from the controller; the controller, communicatively coupled to the monitoring device and the control device, analyzing the process data received from the monitoring device and sending commands based on the process data to the control device; a communications device, communicatively coupled to the controller and an external communications network, transmitting controller data relating to the analysis to the remote management facility; and a data store, communicatively coupled to the controller, storing the process data.

Another embodiment is a method for managing a chemical process at a vehicle wash facility that is communicatively coupled to a remote management facility. The method includes monitoring the chemical process to produce process data; monitoring at least one environmental parameter; reporting the process data and the environmental parameter to a controller; analyzing, via the controller, the process data and the environmental parameter to produce controller data relating to the analysis; controlling the chemical process in response to controller data from the controller; transmitting the controller data to the remote management facility; and storing, in a data store, at least one of the process data, the environmental parameter or the controller data.

Another embodiment is a computer program product, such as a computer program storage medium readable by a computer system, encoding a computer program for executing on a computer system a computer process for managing a chemical process at a vehicle wash facility that is communicatively coupled to a remote management facility. The computer process includes monitoring the chemical process to produce process data; monitoring at least one environmental parameter; reporting the process data and the environmental parameter to a controller; analyzing, via the controller, the process data and the environmental parameter to produce controller data relating to the analysis; controlling the chemical process in response to controller data from the controller; transmitting the controller data to the remote management facility; and storing, in a data store, at least one of the process data, the environmental parameter or the controller data.

Another embodiment is a method for managing a chemical process at a remote vehicle wash facility. The method includes receiving process data from the remote vehicle wash facility; receiving an environmental parameter that influences a usage rate of at least one chemical in the chemical process; analyzing the process data and environmental parameter; and transmitting, based on results of the analysis, a notification to a client computer.

Another embodiment is a computer program product, such as a computer program storage medium readable by a computer system, encoding a computer program for executing on a computer system a computer process for managing a chemical process at a remote vehicle wash facility. The computer process includes receiving process data from the remote vehicle wash facility; receiving an environmental parameter that influences a usage rate of at least one chemical in the chemical process; analyzing the process data and the environmental parameter; and transmitting, based on results of the analysis, a notification to a client computer.

Another embodiment is a system for managing a chemical process at a remote vehicle wash facility. The system includes a communication device, communicatively coupled to the remote vehicle wash facility and a server, receiving process data from the vehicle wash facility, receiving an environmental parameter, and sending the process data and environmental parameter to the server; the server, communicatively coupled to a client computer, analyzing the process data and environmental parameter; and the server, based on the results of the analysis, transmitting a notification to a client computer.

DETAILED DESCRIPTION OF THE INVENTION

In the following description of the exemplary embodiment, reference is made to the accompanying drawings that form a part hereof, and in which is shown by way of illustration specific embodiments in which the invention may be practiced. It is to be understood that other embodiments may be utilized as structural changes may be made without departing from the scope of the present invention.

Figure 1:
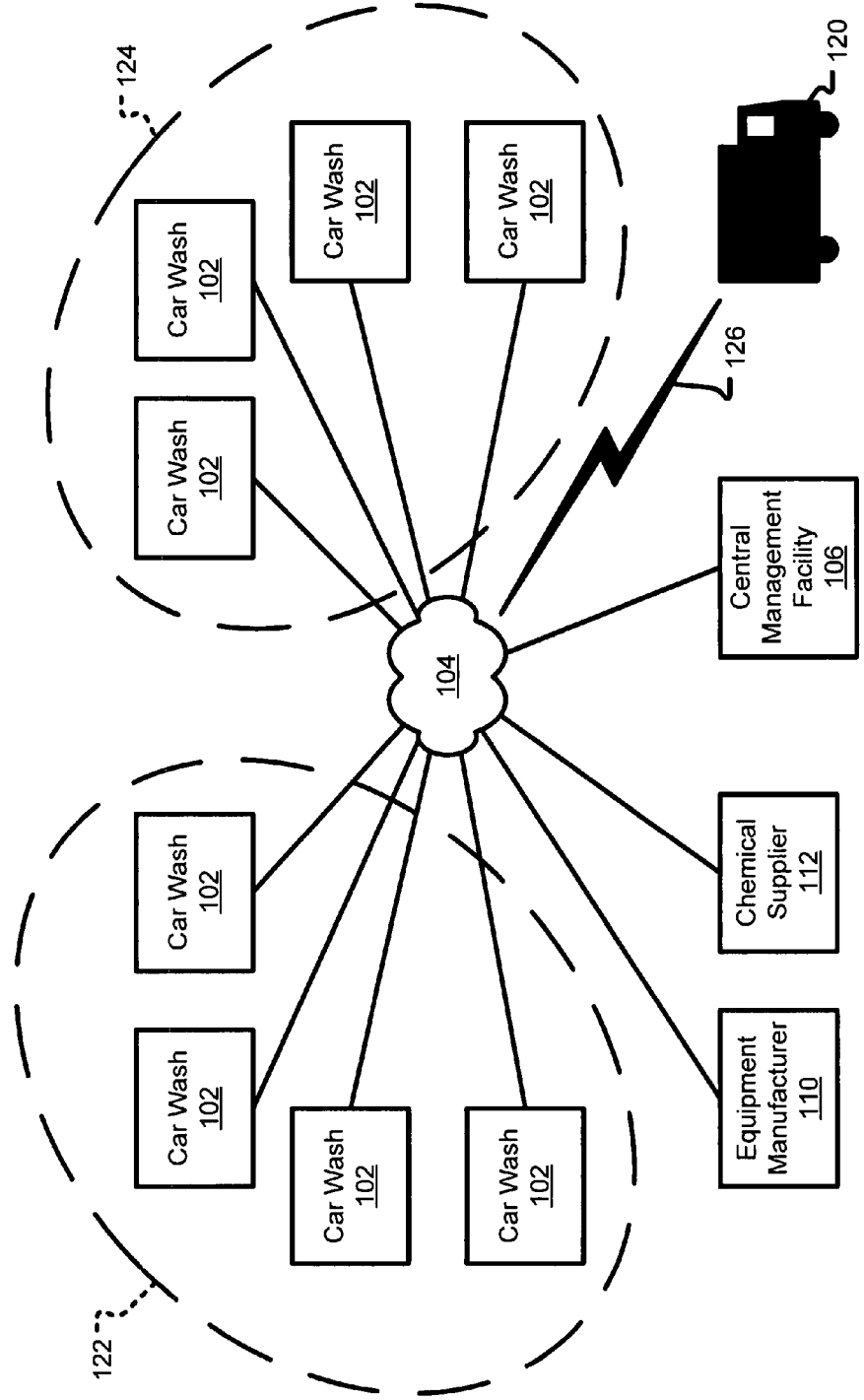
FIG. 1 illustrates an exemplary communications network showing remote vehicle wash facilities connected by a communications network to a central management facility in an embodiment of the present invention.

FIG. 1 illustrates an exemplary environment of remote vehicle wash facilities 102 connected by a communications network 104 to a central management facility 106 in an embodiment of the invention. The monitoring and control systems at each of the vehicle wash facilities 102 collect "process data," the definition of which is used here to broadly include any type of data used or generated by any and all processes performed at the vehicle wash facility 102. The monitoring and control systems at each of the vehicle wash facilities 102 use process data and instructions input by operators to control the operation of the processes (e.g., selections of chemicals used in the wash or alteration of wash sequences) performed at the vehicle wash facilities. In an embodiment, the monitoring and control system at each facility 102 also utilize one or more environmental parameters to control operations of processes performed at the facilities 102.

Exemplary process data may include data generated at the remote vehicle wash facility 102, including without limitation raw chemical characteristic data (e.g., chemical levels, temperatures, and usage rates) generated by monitoring devices, analytical results derived from the raw chemical characteristic data at the remote vehicle wash facility 102, and alarm indicators relating to chemical characteristic data. Exemplary environmental parameters include without limitation ambient temperature, local road construction information, weather reports, soil sample data, an anticipated schedule for chemical deliveries, regulatory restrictions governing various aspects of chemical and wash water disposal, etc. Some or all of the process data and other environmental parameters may be made available or transmitted by the communications network 104 to offsite facilities, such as the central management facility 106. The communications network 104 further allows the transmission of control commands and other environmental parameters to the remote wash facilities 102. As shown in the embodiment, process data and environmental parameters may also be transmitted or made available directly to an equipment manufacturer 110 and the chemical supplier 112. Furthermore, data may also be transmitted via a wireless communication link 124 to a service vehicle 120.

FIG. 1 also shows the vehicle wash facilities 102 grouped into two regions 122 and 124. It should be understood that a vehicle wash operator may group vehicle wash facilities 102 into any number of regions as necessary or convenient for efficient management. For example, vehicle wash facilities 102 that are geographically proximate to each other (e.g. on one side of town) may be grouped into one region 122 while other facilities on the other side of town may be grouped into another region 124. Alternatively, facilities may be grouped by category (e.g., coin-operated, stand-alone, gas station, brand-name, wash system type, contract type, etc.).

It should be understood that the communications network 104 may utilize any number of communication technologies depending on functions required by the embodiment. Examples of specific technologies used in communications networks 104 contemplated include without limitation terrestrial, cellular, satellite, short-wave, and microwave connections to the Internet, directly between facilities using modems or other interface devices, or through other communications networks, such as local area networks or wide area networks. Any combination of these or other communications networks may be utilized and remain within the scope of the invention.

Similarly, the communications network 104 is also shown as connected to a mobile service vehicle 120 via a wireless communication link 126. The service vehicle 120 may also be directly connected to the communications network 104 as shown in FIG. 1. Alternatively, the service vehicle 120 may be connected to the communications network 104 through a dedicated connection to some facility, such as the central management facility 106, rather than receiving process data and environmental parameters directly from the network 104, without departing from the scope of the invention.

The equipment manufacturer 110 may receive process data, environmental parameters or notifications (e.g., an order command) directly or indirectly from vehicle wash facilities 102 or from the central management facility 106. This connection allows the equipment manufacturer 110 to schedule maintenance and repair activities based on the process data received from the distributed system. For example, if wash pressure is detected as decreasing over time, the equipment manufacturer 110 may schedule a repair technician to visit the corresponding wash facility to repair or replace a pump or to patch leaks in the plumbing system.

Likewise, the chemical supplier 112 can receive the similar data and be alerted to any conditions at the vehicle wash facilities 102 that may require action on the chemical supplier's part. For example, based on an aggregated determination of chemical levels of a given type in a region, the chemical supplier 112 may predict an increased or decreased need for a given chemical in the region, and thereby adjust its production schedule for that chemical accordingly.

In an embodiment, information is provided to the individuals at the equipment manufacturer 110, the chemical supplier 112, the central management facility 106 and the service vehicle 120 on a web browser implemented on a computer system local to the equipment manufacturer 110, the chemical supplier 112, the central management facility 106 and the service vehicle 120, respectively. In this embodiment, the network 104 may be an Intranet or the Internet.

Figure 2:
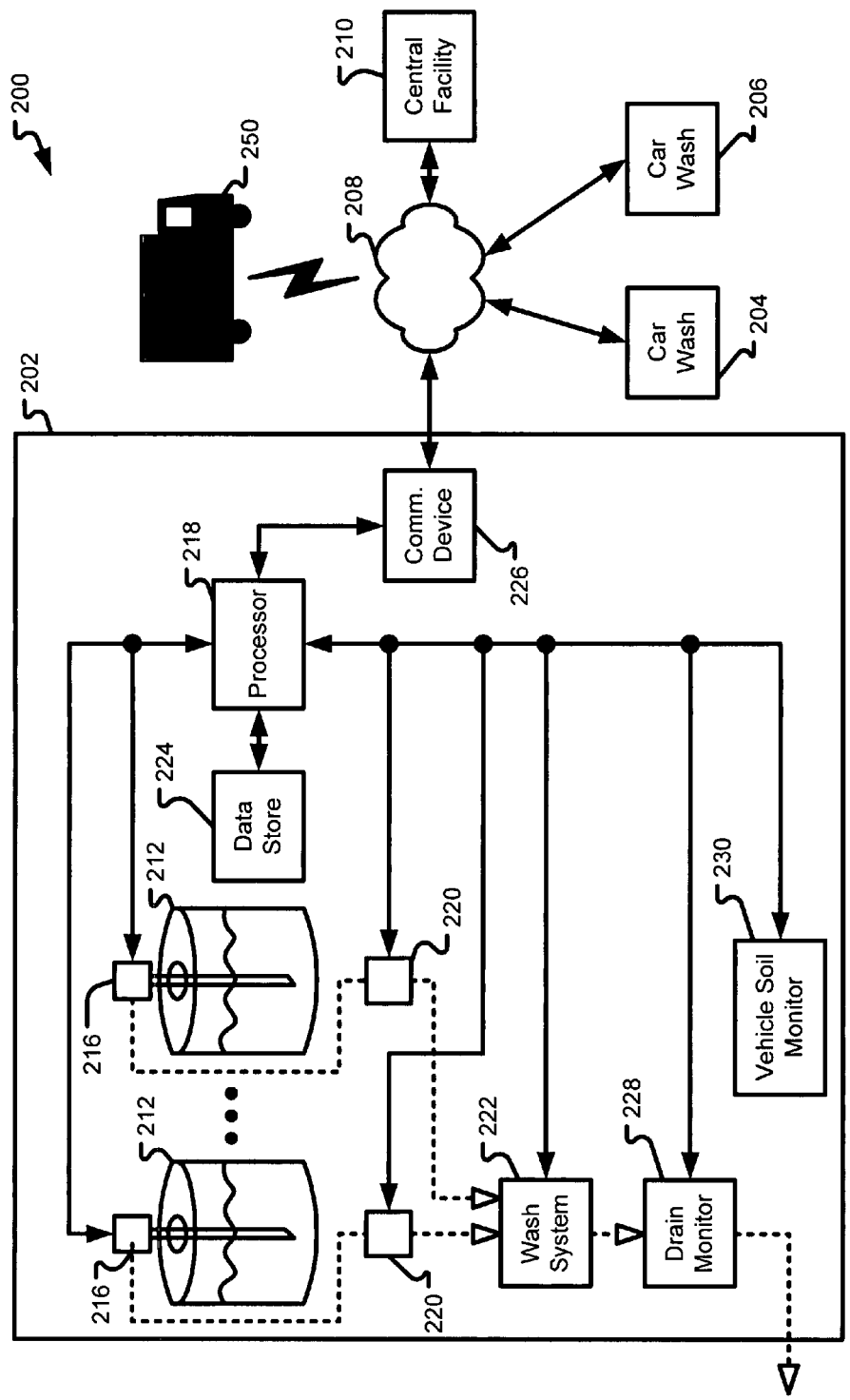
FIG. 2 illustrates an exemplary topology of chemical processes, monitoring devices, control devices, processing devices and communication devices relative to a vehicle wash facility in an embodiment of the present invention.

FIG. 2 illustrates an exemplary topology of chemical processes, monitoring devices, control devices, processing devices, and communication devices at a remote vehicle wash facility 202 in an embodiment of the present invention. Similar to the embodiment shown in FIG. 1, FIG. 2 illustrates the general environment 200 including three remote vehicle wash facilities 202, 204, 206, connected via a communications network 208 to a central management facility 210. A communication line with a service vehicle 250 is also shown. A detailed view of the topology of an exemplary monitoring and control system in accordance with the present invention is shown within the remote vehicle wash facility 202. Note that data communication connections are indicated by a solid line to distinguish them from process piping, which are indicated by dashed lines.

At any remote vehicle wash facility 202, 204, 206 to which the present invention may be applied, there is at least one chemical process. Specific examples of chemical processes used at vehicle wash facilities may include, without limitation, detergent storage and dispensing (whether the detergent is liquid or solid), wax storage and dispensing, water application, effluent disposal, and drying. As such, a chemical process includes any and/or all operations performed by a vehicle wash facility 202, 204, 206 during one or more wash cycles for one or more vehicles. For the purposes of this application, the exemplary "chemical processes" may also include operation of equipment necessary to deliver, maintain, measure, control and alter a chemical, including mechanical applicators, scrubbers, displays, fans, storage vessels or drums, mixers, valves, level sensors, pumps, heaters, coolers, and the like. In the exemplary embodiment shown in FIG. 2, the processes are represented as a series of chemical storage tanks 212, illustrated by the two storage tanks 212 connected by an ellipsis, although it should be understood that the invention applies equally to any type of chemical or fluid process that is subject to electronic monitoring and control.

Associated with one more of the chemical processes is at least one monitoring device, depicted in the exemplary embodiment as level sensors 216 reporting the level of chemical remaining in the storage tank 212. Such electronic level sensors 216 may include without limitation capacitance probes, infrared beams, and pressure sensors. An exemplary capacitance probe type level sensor 216 is illustrated, which is capable of detecting the remaining amount of liquid chemical in the storage tank and (periodically or continuously, depending on the type of sensor used) communicating that process data to the controller 218. It should be understood that the illustrated placement of the sensors 216 are merely exemplary and are not intended to limit the physical configuration of any monitoring devices in the system.

In addition to monitoring devices, the remote facilities also may be equipped with one or more process control devices. In an embodiment of the present invention, a control device may be a control valve 220 through which the storage tank 212 is connected to the wash system 222. For example, the control valve 220 controls the amount of chemical from the tank 212 that is used during a wash cycle. Control valves 220 can take many different forms depending on the chemical and use including metering pumps and motorized valves for liquid applications, and volumetric and gravimetric feeders for solid chemical dispensing. In the illustrated embodiment, each control valve 220 is connected to the controller 218 to receive control commands therefrom and communicate data regarding the performance of the valve to the controller 218, if necessary.

Alternatively, control devices may also control other systems, such as heaters, pumps, motors, lights, coin-operated machines (e.g., towel vending machines, coin-operated wash control systems), keypad wash consoles, etc. For example, a vehicle wash operator may remotely set a keypad wash console to offer complimentary upgrades at a specified time of day. It should be understood that the illustrated placement of the control valves 220 are merely exemplary and are not intended to limit the physical configuration of any control devices in the system.

The controller 218 receives process data and environmental parameters from monitoring devices at the remote vehicle wash facility 202 and issues commands to control processes at the facility 202. It should be noted that the term 'controller' is used here in the broadest sense and may consist of a general-purpose computer executing software and a combination of hardware, firmware and software. Furthermore, the term "controller" may denote a central or distributed processing system. The controller 218 is shown in greater detail in FIG. 6 in accordance with an embodiment of the present invention.

As illustrated, the controller 218 is connected to a data store 224 in the embodiment shown, which allows the controller 218 to access and store process data and environmental parameters as necessary. The controller 218, depending on the embodiment, may operate in several different ways. For example, the controller 218 may not be required to process any raw data but rather to simply transmit the raw data to the central management facility 210 over the communications network 208. In other embodiments, the controller 218 may analyze the raw data and transmit the analytical results derived from the raw data to the central management facility 210 including notifications like alarm indicators (such as "low chemical alarm" or "malfunction alarm") or condition indicators (such as "all systems functioning properly" or "currently using chemical X"). In an embodiment, the data store 224 also stores data received from the central management facility 210 over the communications network 208. The data received from the central management facility 210 includes, among other types of data, environmental parameters for a geographic region or area associated with each vehicle wash facility 202, 204, 206.

The controller 218 may continuously or periodically transmit and receive data to/from the central management facility 210, as appropriate. Furthermore, the controller 218 may transmit data and notifications to one or more recipients, such as jobbers and chemical suppliers, in addition to the central management facility 210. Indeed, in accordance with one embodiment, the controller 218 serves as a thin client that transmits and receives data to the central facility 210 during regularly scheduled time intervals. For example, the controller 218 may transmit collected data to the central facility 210 hourly, daily, weekly, or even after each individual wash cycle for a vehicle. Optionally, the controller 218 may be designed to transmit specific data in response to a query from an operator, in response to a query issued by the central facility 210, or in response to some preset condition, such as the chemical level falling below a specified level.

The controller 218 uses process data and environmental parameters to control operation of the various processes at the facility 202. For example, the controller 218 may automatically, or in response to a command, switch between storage tanks 212 to change the types of detergent used in the wash system 222 depending on data received from the level sensors 216. Illustrating this, the controller 218 may switch from applying a first detergent stored in a first storage tank 212 to a second detergent stored in a second storage tank 212 in response to an environmental parameter sensed by a level sensor 216.

In an embodiment, the controller 218 controls operation of various processes at the facility 202 based on various environmental parameters either sensed at the facility 202 or received from the central management facility 210 and stored in the data store 224. For example, the controller 218 may increase the wash time for a particularly dirty vehicle or change the type of detergents and waxes used based on the type of soil located on a vehicle. The controller 218 may also control the temperature of water applied with chemicals used during processes at the wash facility based on the amount of soil found on a vehicle. Another example of such control relates to increasing or decreasing levels of alkalinity, surfactancy, acidity and salinity in a chemical or rinse agent applied to vehicles, or increasing/decreasing drying time. Any one of these factors may be modified based on received or sensed environmental parameters, such as, without limitation, type and amount of soil detected on a vehicle, current or average outside temperature, current weather conditions and current time of year (summer, fall, winter or spring). Automatic control of the processes by the controller 218 may also be adjusted in response to external data provided periodically by the operator (e.g., weather conditions that may effect soil composition, etc.) or may be designed into the controller 218 by the manufacturer or installer.

The controller 218 is coupled to a communication device 226 in the exemplary embodiment. The purpose of the communication device 226 is to interface between the controller 218 and the communications network 208 and support the transfer of data therebetween. In the exemplary embodiment shown, the communication device 226 is a modem connected to a terrestrial telephone line, although, as discussed above, any means for communicatively coupling the controller 218 to the communications network 208 is contemplated.

For the purposes of further illustration, several additional monitoring devices for collecting process data and/or environmental parameters have been shown in the exemplary embodiment. More specifically, an effluent monitoring device 228 and a vehicle soil monitoring device 230 are illustrated. The effluent monitoring device 228 monitors the amount and/or composition of chemicals and soil in the effluent coming from the vehicle wash system 222 before the effluent is discharged to the public sewer. The effluent monitoring device 228 can collect data related to the amount and type of soil present on the vehicles using the vehicle wash 202 and the amount and type of excess detergent or wax present in the effluent.

Data, which may be considered process data or environmental parameters, collected by the effluent monitoring device 228 is provided to the controller 218 for analysis and/or uploading to the central management facility 210. In one embodiment, the data collected by the effluent monitoring device 228 is analyzed against various regulatory restrictions governing the disposal of chemicals in the particular city, county, Parrish, state, province, country or township where the facility 202 is located. Such restrictions may be specified in an ordinance, statute, referendum, ballot measure or any other type of legal or public document governing or proposed for governing disposal of chemicals within a specified geographical area. Based on analysis of the data against the various regulatory restrictions, the controller 218 may either control processes of the facility 202 to ensure that the facility complies with the restrictions and/or issue a notification to the central management facility 210 that one or more regulatory restrictions are not being complied with.

Data collected by the effluent monitoring device 228 may also be stored for later use in the data store 224 or transmitted to the central management facility 210 or both. If transmitted to the central management facility 210, the central management facility 210 may actually utilize data collected by the effluent monitoring device 228 to manage processes at the wash facility 202 through the controller 218. In this sense, the central management facility 210 issues commands to the controller 218 related to control over one or more processes at the wash facility 202, such as, without limitation, modifying one or more wash processes to comply with a regulatory restriction.

The vehicle soil monitoring device 230 collects data related to the composition and amount of soil that may be located on a vehicle. Based on information received by the vehicle soil monitoring device 230, the vehicle soil monitoring device 230 may be used to determine such things as the appropriate detergent, wax, wash pressures, and wash times for each vehicle using the wash facility 202. In one embodiment, a customer can wipe a soil sample from a location on the vehicle and deposit the sample in the vehicle soil monitoring device 230, which determines the composition of the soil. With this information, the controller 218 can select the appropriate detergent and other wash characteristics to best clean the vehicle. In another embodiment, the vehicle soil monitoring device 230 includes an input means for users to enter information related to the composition of the soil believed to be located on the exterior of the vehicle. In this embodiment, this input means may receive such information local to the vehicle soil monitoring device 230, or alternatively, over a remote connection to the central management facility 210. As such, jobbers or vehicle wash attendants may issue instructions related to soil composition over a remote network connection. Data received by the soil monitoring device 230 is communicated to the controller 218, which analyzes the data and adjusts various wash processes based on said analysis. For example, a particularly oily sample may result in automatic selection of a cleaning agent having a relatively high surfactant concentration.

Data collected by the vehicle soil monitoring device 230 may also be stored for later use in the data store 224 or transmitted to the central management facility 210 or both. If transmitted to the central management facility 210, the central management facility 210 may actually utilize data collected by the soil monitoring device 230 to manage processes at the wash facility 202 through the controller 218. In this sense, the central management facility 210 issues commands to the controller 218 related to control over one or more processes at the wash facility 202, such as, without limitation selecting the appropriate detergent and other wash characteristics to best clean the vehicle.

Figure 3:
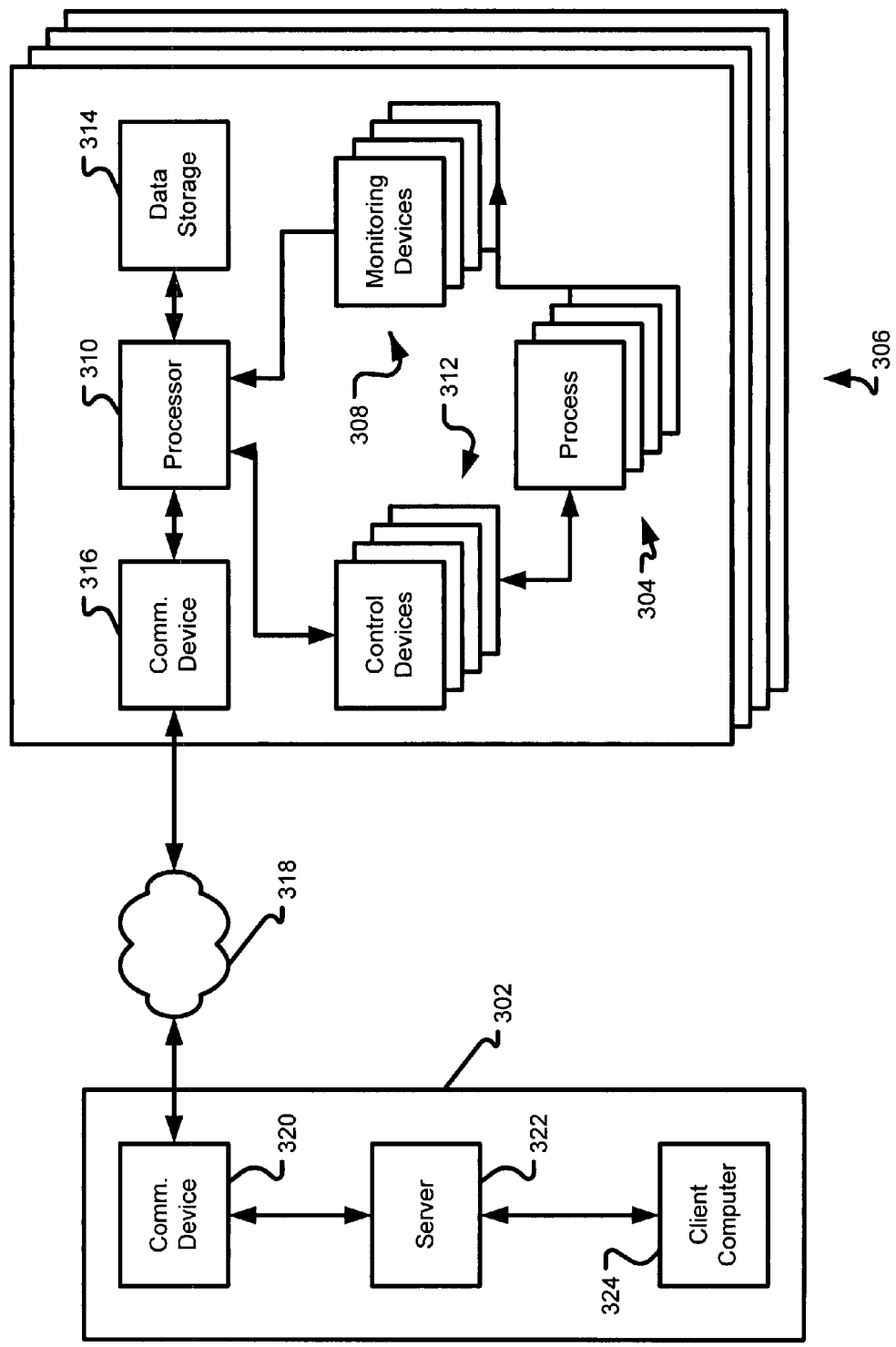
FIG. 3 illustrates a generalized embodiment of the present invention utilized by a central management facility to monitor and control chemical processes at one of a plurality of remote chemical process facilities.

FIG. 3 illustrates a generalized embodiment of the present invention utilized by a central management facility 302 to monitor and control processes 304 at one of a plurality of remote chemical process facilities 306, which may include one or more chemical process monitoring devices 308 that are communicatively coupled to a controller 310. An electronic monitoring device 308 may take many forms depending upon the type of process it is designed to monitor, the data it reports, and the function complexity required by the user. Examples of simple monitoring devices include thermistors, pre-calibrated temperature-sensitive resistors, and pressure sensors. More complex monitoring devices may include one or more data sensing devices, a controller, data storage, and a dedicated power source.

Also, a chemical process facility 306 may include chemical process control devices 312. Examples of such devices 312 include process equipment such as heaters, pumps, control valves, sprayers, scrubbers and the like. Through the control devices 312, an operator can control the operation of the processes at the remote chemical process facility 306, thereby allowing the operator to change process settings in response to changing conditions at the facility. The control devices are communicatively coupled to the controller 310 from which they receive commands from the operator or commands generated by the controller 310 itself. Many control devices 312 may also perform monitoring functions. Furthermore, although the control devices 312 and monitoring devices 308 have heretofore been discussed separately, such devices may be combined into a single device within the scope of the invention.

The controller 310, in addition to being communicatively coupled to the monitoring devices 308 and control devices 312, is communicatively coupled to a data store 314, which is capable of storing process data, environmental parameters and controller data produced by the controller 310, and a communications device 316. In an embodiment, controller data is broadly defined herein as data resulting from an analysis of process data and/or one or more environmental parameters by the controller 310. Data, i.e., process data, environmental parameters or controller data, may be transmitted by the controller 310 through a communications device 316, which is communicatively coupled to the central measurement facility 302 through a communications network 318. In the embodiment, the central management facility 302 is also provided with a communication device 320, which can receive the data transmitted from the remote facilities 306 and pass the data on to a server 322. The server 322 may store the data and may analyze the data to determine if any action is required. Based on the results of the analysis, the server may send a notification to the client computer 324 or may send a command or notification to the vehicle wash facility 306. For example, the server 322 may receive an alarm indicating low chemical levels at a specified facility. In response to the alarm, the server 322 may send a signal to a client computer 324, such as an email to the jobber or a page to the jobber's cell phone.

Various other embodiments of the means of communicating between the remote chemical process facilities 306 and client computer 324 are contemplated as embodiments of the present invention. For example, the communication device 320 and server 322 need not be physically located at the central management facility 302. In an embodiment, the server 322 may be located at some third party "server farm" that is accessible by any client computer 324 that has access to the Internet. In another embodiment, one or more of the remote facilities 306 may be equipped with a server 322, wherein each facility with a server is provided with its own internet access and can be queried by any client computer 324 connected with the communications network.

Figure 4:
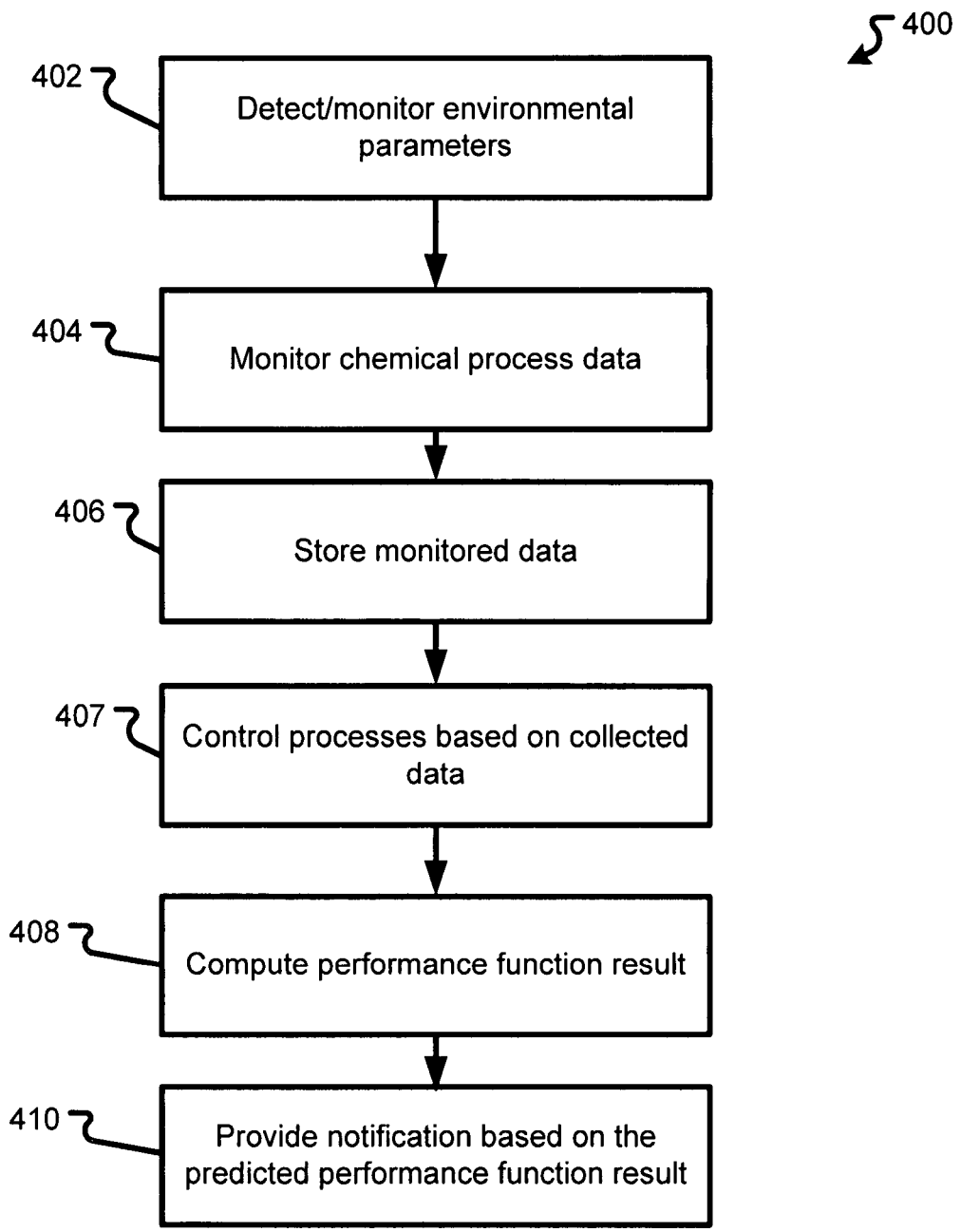
FIG. 4 illustrates operations for monitoring operations at a vehicle wash facility in an embodiment of the invention.

FIG. 4 illustrates a process 400 for managing operation of a vehicle wash facility in accordance with an embodiment of the invention. Depending on the embodiment, the management process 400 may be performed to control processes of the vehicle wash facility, to monitor processes of the vehicle wash facility or to control and monitor processes of the vehicle wash facility. As such, the management process 400 includes various optional operations for controlling and/or monitoring one or more processes performed at the vehicle wash facility. The operations of the management process 400 are performed using an operation flow beginning with a detection operation 402 and ending with a notification operation 410.

Flow starts in detection operation 402 wherein one or more environmental parameters are continuously or periodically monitored by monitoring devices at the vehicle wash facility or the central management facility. Environmental parameters, as used here, may include any environmental or process conditions that have an effect on the amount or type of chemical(s) necessary to effectively wash a vehicle. In a general sense, an environmental parameter can be considered to be data relating to any condition that would affect the performance of the washing processes and/or the usage rate of the available chemicals. In contrast, process data includes information about the characteristics, including composition, quantity, usage rate, and type of a chemical. Process data also includes the temperature of water applied with each chemical used during washing processes at a vehicle wash facility.

An example of an environmental parameter is the soil load on the vehicles using the vehicle wash facility. In one embodiment, the soil load can be determined from analysis of the soil on the vehicle. In this case, some monitoring device (such as a mass spectrometer, interferometer or infrared beam) may be used to determine the amount of soil on the surface of each vehicle as it enters the vehicle wash facility. In one embodiment, a customer can wipe a soil sample patch (e.g., a piece of paper or cloth) against a surface of the vehicle to remove an amount of the soil. The soil sample patch is analyzed to determine the composition of the soil. Thereafter, the controller or server can determine the best sequence or combination of detergents, rinses, and waxes for removing the soil from the vehicle.

It should be appreciated that any type of soil analysis device or method may be employed to determine the composition of the soil. For example, conventional methods for analyzing soil composition include, without limitation, analyzing soil samples in a laboratory wherein various test chemicals are applied to the soil sample. In this case, the laboratory may be located at the vehicle wash facility. Alternatively, the soil composition used by the present invention to control chemical processes at the vehicle wash facility may be a collective sample taken from a sample of vehicles in the area of the vehicle wash facility. As such, the laboratory may be located remote from the vehicle wash facility, such as at a central management facility.

Soil samples can also be taken from various locations on the vehicle to maximize the effectiveness of the wash process for specific parts of the vehicle. For example, excessive tar on the wheels and running boards may suggest an increased concentration of surfactant and alkalinity for use on the wheels and sides of the vehicle, while excessive mud on the back of the vehicle may suggest an increased pre-soak time. Such information is very useful for ensuring quality control and in determining the amount of detergent necessary to adequately wash customer vehicles.

Furthermore, by detecting trends in the soils compositions and locations, a wash facility can predict the usage rate of such chemicals and increase the precision with which exhaustion of specific chemicals may be predicted. For example, a road resurfacing project near the wash facility may increase the usage rate of surfactant and alkalinity, thereby changing the scheduled frequency of replenishing the chemical. Detection of excessive tar in the soil load of multiple vehicles over a period of time can predict this change in usage rate and allow the operator to ensure that the chemical does not run out or the chemical vendor to increase production.

Alternatively, other examples of environmental parameters may include without limitation the past, current and forecasted weather conditions near the facility, the quantity and chemistry of soil in an effluent of the processes at the facility, the type of detergents and other chemicals being used at the facility, the presence of ice buildup on the vehicle, the facility's throughput in vehicles, time per vehicle, and the current temperature of the surfaces of the vehicles to be cleaned, which can vary significantly from an ambient temperature determined by monitoring the current weather conditions. It should be appreciated that these parameters may be monitored at the vehicle wash facility or at a remote location, such as the central management facility. If monitored at the central management facility, these parameters, or alternatively, commands for controlling processes at the facility based on these parameters, are transmitted to a controller at the facility over a communications network in accordance with an embodiment depicted in FIG. 2. Furthermore, these parameters may be monitored through a variety of known methods, including monitoring weather conditions on an Internet site and querying customers through a user interface at the wash control panel. Other means for monitoring these parameters may be through a jobber or customer complaint feedback surveys.

Another environmental parameter that may be monitored is a residue sample from the vehicle after the washing completes. For example, the customer can be offered a chance to wipe samples from various locations on the vehicle to provide feedback to the system on wash performance. Such feedback can be used to automatically increase or decrease types or concentrations of chemicals used in the washing process, to modify usage rate data, and to alter exhaustion point predictions (because changes in chemical usage rates may change to optimize wash performance). Customers may be offered a discount or coupon for subsequent washes as incentives to provide the samples.

A monitoring operation 404 monitors process data indicative of the quantity and/or type of chemicals currently available for use at the facility. The monitoring operation 404 also monitors other forms of process data, such as, without limitation, the temperature of water applied with each chemical during washing processes. The monitoring operation 404 monitors the parameters related to these chemicals used at the facility and generates a set of process data. As discussed previously, monitoring the chemical inventory can be achieved in many ways and does not necessarily require a direct measurement of the amount of chemical remaining in storage tanks. Any method of monitoring or otherwise tracking the amount of chemical remaining at facility is contemplated under the scope of this invention. The monitoring operation 404 can monitor chemical quantities that are currently hooked up to the washing system and/or chemical quantities of chemical reserves that are merely stored on-site. As for the latter quantities, the operator can use this information to monitor the quantities available in the on-site inventory, which mean the difference between a chemical delivery to the wash facility or merely a change of connection to a full drum of chemical.

A storage operation 406 stores collected process data and the environmental parameter(s) detected by the detection operation 402 and the process data monitored by the monitoring operation 404, in a storage device at the facility, or alternatively, transmits the monitored data to a server computer for storage. However, it should be understood that some computations in an embodiment of the present invention may be accomplished without storing specific monitored data. For example, detection of a chemical level dropping below a predetermined or dynamically computed threshold may communicate an alarm to an operator without storing the quantity or type of the chemical.

In one embodiment, the management operation 400 performs a control operation 407. The control operation 407 controls the processes at the vehicle wash facility based on the collected environmental parameter(s) detected by the detection operation 402 and the process data monitored by the monitoring operation 404. As an example of control based on process data, the control operation 407 may automatically, or in response to a command, switch between storage tanks to change the types of detergent used in the wash system depending on data received from the level sensors. As an example of control based on environmental parameter(s), the control operation 407 may increase the wash time for a particularly dirty vehicle or change the type of detergents and waxes used based on the type of soil on a vehicle. The control operation 407 may also control the temperature of water used during processes at the wash facility based on the amount of soil detected on a vehicle. Further examples of control over processes at a vehicle wash facility are provided in more detail with respect to FIGS. 1-3, supra.

In another embodiment, the management operation 400 performs a computation operation 408. The computation operation 408 evaluates the collected data to predict the time in which a given chemical supply will be exhausted at the wash facility. The evaluation is done using a performance function that relates an actual or predicted chemical usage rate of a chemical and one or more quantity parameters of the chemical monitored in the monitoring operation 404 to predict a time point when the chemical is expected to be exhausted. The term "exhausted" is directed to describe some substantially low quantity of the chemical at which the operator desires to replenish the chemical (e.g., by swapping in a full drum of the chemical, etc.).

In one embodiment, the performance function predicts that the current rate of usage of a given chemical and the detected quantity of the chemical will exhaust the supply of the chemical by a given point in time. A buffer quantity or a lead time may be built into the performance function to provide time for the operator to schedule the appropriate chemical shipment to the wash facility and/or schedule a visit by the operator to the wash facility before the chemical is actually exhausted completely.

In another embodiment, the performance function projects a change in the current usage rate of the chemical, based on the environmental parameters, to revise a previous exhaustion time point prediction. For example, if the performance function initially predicts exhaustion of a chemical within two weeks, but the environmental parameters indicate a big rain storm in the near future, the performance function may revise the initial exhaustion time point prediction because a higher volume of vehicle washes are expected after the storm. Likewise, local road construction, a detected trend in customer vehicle types, soil loads, customer preferences (e.g., one wax brand over another, which type of wash type—Basic, Deluxe, Super Deluxe—is selected, etc.), faulty operation of facility equipment, and other environmental parameters may impact the chemical usage rate and cause the performance function to revise the exhaustion time point prediction.

Results of the performance function analysis may be used to render conclusions related to aspects other than estimating an exhaustion date for one or more chemical(s). For example, these results may indicate a mechanical failure at the facility if a chemical is being exhausted at a faster or slower rate than normal. Furthermore, these results may be utilized to generate trends of chemical usage over a given period in time, e.g., weekend, weekend and holiday trends.

In one embodiment, the performance function has been predetermined by the manufacturer of the process equipment, the chemical supplier or manufacturer, or the operator, stored in the data store at the facility, and is accessible to the system's controller. In an alternate embodiment, the performance function is not stored at the facility but is made available (such as by an Internet connection to the process equipment manufacturer's website) to the controller at the facility when the evaluation is necessary. This may be achieved either by the facility transmitting the parameters offsite for evaluation and then receiving the results of the evaluation, or by downloading a copy of the performance function which it then uses to evaluate the data using the processing capabilities at the facility and subsequently discards. One utility of these alternatives is that the performance function may be easily revised because it is kept at only one location.

In yet another embodiment, the management operation 400 performs a notification operation 410. The notification operation 410 determines whether the performance function result requires a notification to be sent to the operator or to other components in the system. For example, if a currently scheduled re-supply visit to the wash facility does not satisfy the revised exhaustion point prediction (e.g., not enough chemical, the wrong chemicals, not soon enough), the operator may be notified by cell phone, by email, by pager, or by some other means. The notification identifies the wash facility requiring attention and the type of notification. The notification may also identify details of the condition associated with the wash facility, such as quantities of one or more available chemicals at the wash facility, availability of chemicals from a chemical supplier, status of equipment, and other information. The notification may also include a recommendation for ordering chemicals or scheduling the next visit to the associated wash facility. In one embodiment, the notification may also automatically order the chemical from the chemical vendor.

The notification operation 410 includes an algorithm for determining when notifications should be sent and to whom they should go. The algorithm may be a part of the performance function or may be a separate function that uses the results of the performance function and other information including environmental and chemical parameters to make its determination. In addition, the algorithm includes user-specified variables such as an escalation process defining a hierarchy of individuals or entities that are to be contacted for specific types of notifications, and in what order.

The escalation process applies a set of business rules for use in determining the order in which specified entities and/or individuals are to receive each particular type of notification. For example, an escalation process may specify the order for a mechanical failure notification as follows: the vehicle wash facility attendant, the jobber, the jobber's manager, and finally, the owner of the vehicle wash facility. Likewise, an escalation process may specify the order for a mechanical failure notification as follows: the jobber, the jobber's manager, and finally, the owner of the vehicle wash facility. Additionally, the escalation process may indicate the form of communication that is to be used to notify the appropriate personnel, as well as escalation for notifying same. Referring to the second example above, the escalation process may specify that the jobber is to be notified about the mechanical failure by email first, then by pager, and finally by cell phone, and all this prior to notifying the jobber's manager. It should be appreciated that any type of escalation process is contemplated by the present invention, and therefore, the present invention is not limited to the examples provided above.

Figure 5:
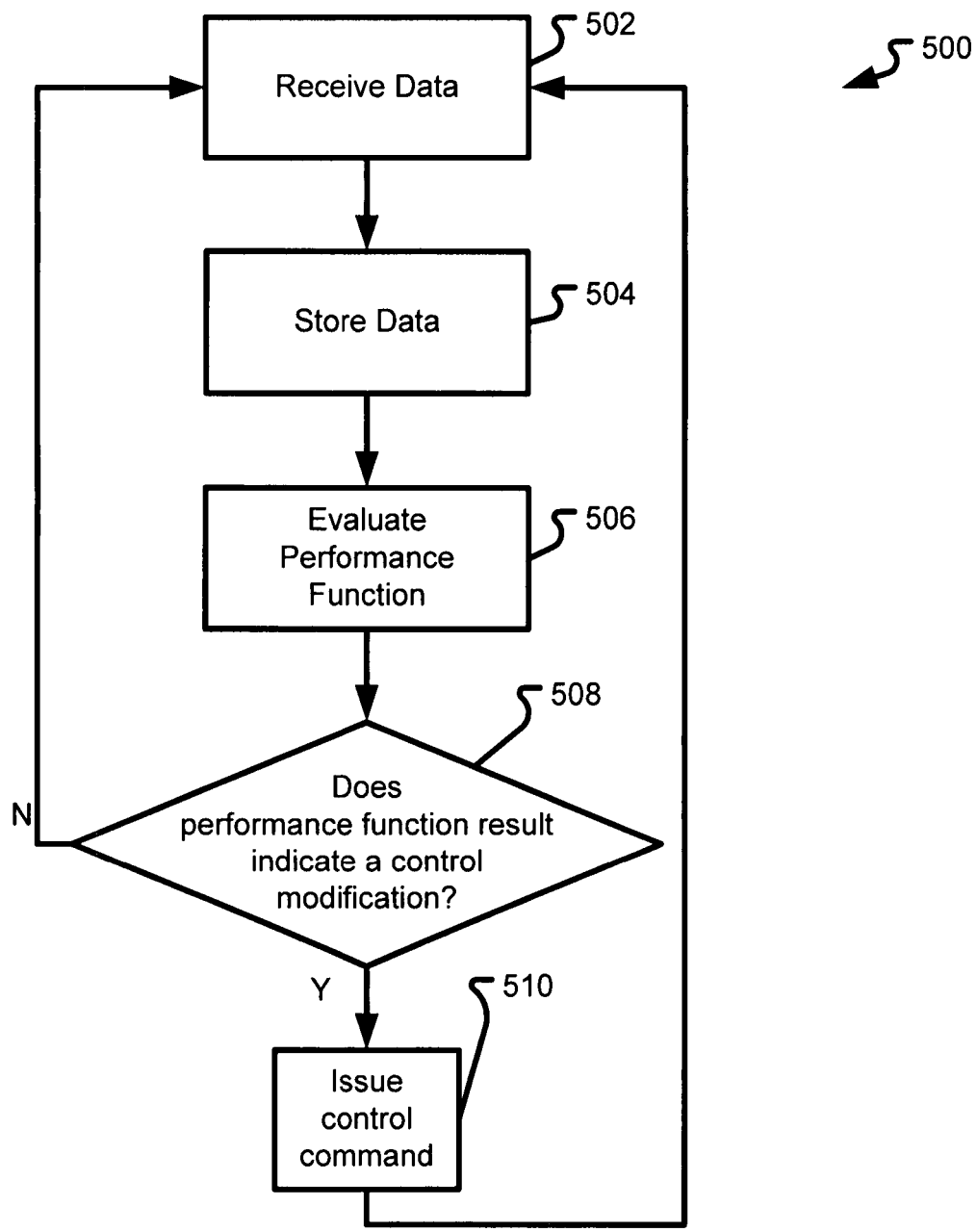
FIG. 5 illustrates operations for performance function aspects in an embodiment of the invention.

FIG. 5 illustrates operations for remote control in an embodiment of the invention. The operation flow is described in relation to a remote location, e.g., a central management facility, communicatively coupled with a single vehicle wash facility, although it should be understood that the logical operations may be implemented at a plurality of facilities.

Operation flow starts in a receiving operation 502, wherein data created by monitoring process data and environmental parameters at the vehicle wash facility are received at the remote location. In addition, external data, primarily additional environmental parameters that are monitored elsewhere, may also be received at the remote location. A storage operation 504 stores the received data in a storage device, i.e., data store, at the remote location. In alternate embodiments, the storage device may be located at either the vehicle wash facility or another remote location communicatively coupled with the remote location.

An evaluation operation 506 evaluates the received data using a performance function that relates environmental parameters and process data. After the data has been evaluated using the performance function, a decision operation 508 determines whether any changes should be made to process settings at the vehicle wash facility based on the performance function result and the data received in the receiving operation 502. In the one embodiment, the decision operation 508 compares the data or performance function result to predetermined wash system standards or current process equipment settings.

If the optimal settings determined by the evaluation operation 506 differ from the current settings, then decision operation 508 passes control to a command operation 510, which issues the control commands necessary to change the differing settings or implement an intended action (e.g., ordering a new shipment of chemical) and updates the database containing the current settings. After the proper control commands are issued, control passes back to the receiving operation 502 and the logical steps are repeated.

If, instead, the decision operation 508 determines that all settings are optimal based on the received data and evaluation results, then processing returns to the receiving operation 502 and the logical operations are repeated. Thus, the logical operations can constitute a repeating control process that continuously evaluates the conditions at the facility and issues commands to the facility to adjust the setting on the process equipment as changing conditions warrant.

Accordingly, a control command may be communicated to the wash facility as a command to control a process of the wash facility. For example, the performance function may determine that a concentration of a given chemical should be increased (e.g., to improve cleaning performance) or decreased (e.g., to delay exhaustion of the chemical) at the wash facility. The server may communicate commands through the network to the control devices (see control devices 312 in FIG. 3) to alter the dosage of the chemical at the wash facility.

Figure 6:
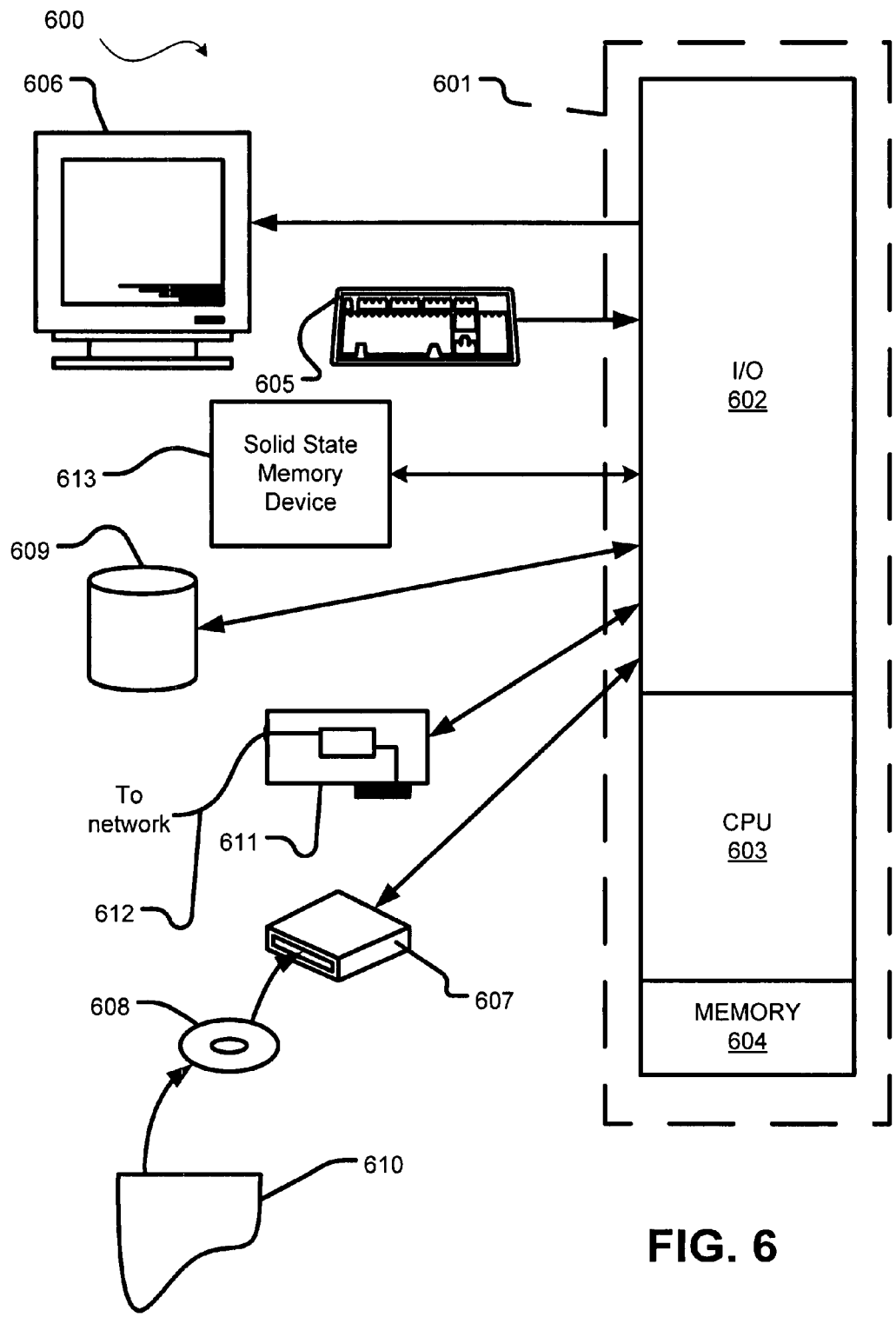
FIG. 6 depicts a block diagram of a suitable computing environment in which an embodiment of the present invention may be implemented.

FIG. 6 depicts a computing system 600 capable of executing a program product embodiment of the present invention. One operating environment in which the present invention is potentially useful encompasses the computing system 600, such as, for example, the controller 218. In such a system, data and program files may be input to the computing system 600, which reads the files and executes the programs therein. Some of the elements of a computing system 600 are shown in FIG. 6 wherein a control module, illustrated as a processor 601, is shown having an input/output (I/O) section 602, a microprocessor, or Central Processing Unit (CPU) 603, and a memory section 604. The present invention is optionally implemented in software or firmware modules loaded in memory 604 and/or stored on a solid state, non-volatile memory device 613, a configured CD-ROM 608 or a disk storage unit 609. As such, the computing system 600 is used as a "special-purpose" machine for implementing the present invention.

Each of the above-noted forms of data storage are broadly included within the definition of "computer program product" used throughout the specification and the claims. That is, generally stated, a computer program product of the present invention may be a solid state, non-volatile memory device or a computer storage media readable by a computer system and encoding a computer program of instructions for executing a computer process.

The I/O section 602 is connected to a user input module 605, e.g., a keyboard, a display unit 606 and one or more program storage devices, such as, without limitation, the solid state, non-volatile memory device 613, the disk storage unit 609, and the disk drive unit 607. The user input module 605 is shown as a keyboard, but may also be any other type of apparatus for inputting commands into the processor 601. The solid state, non-volatile memory device 613 is an embedded memory device for storing instructions and commands in a form readable by the CPU 603. In accordance with various embodiments, the solid state, non-volatile memory device 613 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. In accordance with one embodiment, the disk drive unit 607 is a CD-ROM driver unit capable of reading the CD-ROM medium 608, which typically contains programs 610 and data. Computer program products containing mechanisms to effectuate the systems and methods in accordance with the present invention may reside in the memory section 604, the solid state, non-volatile memory device 613, the disk storage unit 609 or the CD-ROM medium 608.

In accordance with an alternative embodiment, the disk drive unit 607 may be replaced or supplemented by a floppy drive unit, a tape drive unit, or other storage medium drive unit. A network adapter 611 is capable of connecting the computing system 600 to a network of remote computers via a network link 612. Examples of such systems include SPARC systems offered by Sun Microsystems, Inc., personal computers offered by IBM Corporation and by other manufacturers of IBM-compatible personal computers, and other systems running a UNIX-based or other operating system. A remote computer may be a desktop computer, a server, a router, a network PC (personal computer), a peer device or other common network node, and typically includes many or all of the elements described above relative to the computing system 600. Logical connections may include a local area network (LAN) or a wide area network (WAN).

Such networking environments are commonplace in offices, enterprise-wide computer networks, intranets, and the Internet.

In accordance with a program product embodiment of the present invention, software instructions stored on the solid state, non-volatile memory device 613, the disk storage unit 609, or the CD-ROM 608 are executed by the CPU. In this embodiment, these instructions may be directed toward communicating data between a client and a server, detecting product usage data, analyzing data, and generating reports. Data, such as products usage data, corporate data, and supplemental data generated from product usage data or input from other sources, may be stored in memory section 604, or on the solid state, non-volatile memory device 613, the disk storage unit 609, the disk drive unit 607 or other storage medium units coupled to the system 600.

In accordance with one embodiment, the computing system 600 further comprises an operating system and usually one or more application programs. Such an embodiment is familiar to those of ordinary skill in the art. The operating system comprises a set of programs that control operations of the computing system 600 and allocation of resources. The set of programs, inclusive of certain utility programs, also provide a graphical user interface to the user. An application program is software that runs on top of the operating system software and uses computer resources made available through the operating system to perform application specific tasks desired by the user. In accordance with an embodiment, the operating system employs a graphical user interface wherein the display output of an application program is presented in a rectangular area on the screen of the display device 606. The operating system is operable to multitask, i.e., execute computing tasks in multiple threads, and thus may be any of the following: Microsoft Corporation's "WINDOWS 95," "WINDOWS CE," "WINDOWS 98," "WINDOWS 6000" or "WINDOWS NT" operating systems, IBM's OS/2 WARP, Apple's MACINTOSH SYSTEM 8 operating system, X-windows, etc.

In accordance with the practices of persons skilled in the art of computer programming, the present invention is described below with reference to acts and symbolic representations of operations that are performed by the computing system 600, i.e., the controller 218, unless indicated otherwise. Such acts and operations are sometimes referred to as being computer-executed. It will be appreciated that the acts and symbolically represented operations include the manipulations by the CPU 603 of electrical signals representing data bits causing a transformation or reduction of the electrical signal representation, and the maintenance of data bits at memory locations in the memory 604, the solid state, non-volatile memory device 613, the configured CD-ROM 608 or the storage unit 609 to thereby reconfigure or otherwise alter the operation of the computing system 600, as well as other processing signals. The memory locations where data bits are maintained are physical locations that have particular electrical, magnetic, or optical properties corresponding to the data bits.

The logical operations of the various embodiments of the present invention are implemented (1) as a sequence of computer-implemented steps running on a computing system, e.g., the controller 218, and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, acts, steps or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The above specification, examples and data provide a complete description of the manufacture and use of the composition of the invention. Embodiments of the present invention; however, may be applied in areas other than laundry operations. For example, in an agriculture applications, a herbicide dispenser may be supply herbicide to a chemical application system, such as an irrigation system or a herbicide sprayer on a crop duster or tractor. The herbicide dispenser data (e.g., timing, amount, and identity of herbicide being dispensed) may be combined with corporate data (e.g., chemical costs, labor costs, field production results, weather conditions, soil conditions, and type of plants) to manage chemical usage. Furthermore, sanitation systems in the food and beverage industries and water treatment industries are also contemplated within the scope of the present invention.

In an embodiment of the present invention, vehicle wash operators may access the central management facility 210 over a network connection to control chemical processes at a plurality of remote wash facilities 202, 204 and 206. In this embodiment, vehicle wash operators may override the automated control features of the present invention by issuing instructions from a remote location. The instructions are carried over a communication network, such as 208, to the central management facility 210, which then forwards the instructions to the controller 218 at the appropriate vehicle wash facility, e.g., 202, 204 and 206. These instructions may be input using any form of input means, such as, without limitation, a computer, a telephone—landline or cellular, a personal digital assistant or laptop computer.

In another embodiment contemplated by the present invention, an identification recognition system may be used for enabling users to input an account code having pre-defined wash parameter preferences specific to the users. The controller 218 receives these pre-defined wash parameter preferences from the identification recognition system and controls wash processes based on same. In accordance with an exemplary embodiment, the identification recognition system is a bar code reader having the users' accounts specified on a bar code on a frequent customer card. In other embodiment, alternatives to bar code systems may be used to input a user's account code. Such system may include, for example, Radio Frequency Identification systems, magnetic identification systems, conventional keypad systems, etc.

In yet another embodiment, a monitored environmental parameter may be a regulatory restriction governing the disposal of chemicals in the particular city, county, Parrish, state, province, country or township where vehicle wash facility is located. Monitored process data may relate to the flow of chemicals and/or rinse agents through a disposal drain discharging the chemicals and/or rinse agents to a public drainage system. In this embodiment, the computation operation 408 of the management process 400 illustrated in FIG. 4 analyzes the collected process data against these regulatory restrictions. Based on analysis of the process data against the various regulatory restrictions, the control operation 407 may either control processes of the facility to ensure that the facility complies with the restrictions and/or the notification operation 410 may transmit a message to the central management facility 210 that one or more regulatory restrictions are not being complied with.

As many embodiments of the invention can be made without departing from the spirit and scope of the invention, the invention resides in the claims hereinafter appended.

The invention claimed is:

1. A method comprising:
monitoring at least one environmental parameter that influences operation of a vehicle wash facility managed by a remote management facility;
monitoring process data concerning operation of the vehicle wash facility with a controller which includes monitoring a current quantity remaining of at least one chemical product at the vehicle wash facility;
transmitting the at least one environmental parameter and the process data to a server computer at the remote management facility;
analyzing, with the at least one computer at the remote management facility, the received environmental parameter and the received process data;
predicting, with the computer at the remote management facility, a time point indicating an expected time at which a supply of the at least one chemical is expected to run out based on the current quantity remaining of the at least one chemical and on the at least one environmental parameter;
providing, from the computer at the remote management facility, a notification based on the time point; and
transmitting a command concerning operation of the vehicle wash facility from the at least one computer at the remote management facility to the vehicle wash facility based on the analysis.

2. The method of claim 1, further comprising automatically selecting, with the computer at the remote management facility and based on the environmental parameter, one of a first chemical and a second chemical to be used during the operation of the vehicle wash facility based on the analysis.

3. The method of claim 1, wherein transmitting a command to the vehicle wash facility comprises transmitting a command that controls an amount of a chemical applied to one or more vehicles during operation of the vehicle wash facility from the computer at the remote management facility to the vehicle wash facility based on the analysis.

4. The method of claim 1, wherein transmitting a command to the vehicle wash facility comprises transmitting a command that controls a temperature of water applied with the chemical to one or more vehicles during operation of the vehicle wash facility from the computer at the remote management facility to the vehicle wash facility based on the analysis.

5. The method of claim 1, wherein transmitting a command comprises transmitting a command that controls a sequence in which chemicals are applied to one or more vehicles during operation of the vehicle wash facility from the computer at the remote management facility to the vehicle wash facility based on the analysis.

6. The method of claim 1, wherein providing a notification comprises identifying a recipient to receive the notification.

7. The method of claim 1, wherein monitoring a current quantity remaining of at least one chemical at the vehicle wash facility includes monitoring a current quantity remaining of at least one of a detergent, a wax or a rinse agent.

8. The method of claim 1, wherein monitoring at least one environmental parameter comprises monitoring at least one of composition of soil on a vehicle, weather conditions in proximity to the vehicle wash facility, type of vehicle, mechanical system status and vehicle temperature.

9. The method of claim 1, wherein analyzing the received environmental parameter and the received process data comprises automatically analyzing, with the computer at the remote management facility, the received environmental parameter and the received process data.

10. The method of claim 1, further comprising transmitting the least one environmental parameter and the process data to at least one of a chemical supplier, an equipment manufacturer and a service vehicle.

11. A computer-readable medium comprising instruction to cause a programmable processor to:
monitor at least one environmental parameter that influences operation of at least one of a plurality of vehicle wash facilities managed by a remote management facility;
monitor process data concerning operation of the vehicle wash facility with a controller which includes monitoring a current quantity remaining of at least one chemical product at the vehicle wash facility;
transmit the at least one environmental parameter and the process data to at least one computer at the remote management facility;
analyze, with the at least one server computer at the remote management facility, the received environmental parameter and the received process data at the remote management facility;
predict a time point indicating an expected time at which a supply of the at least one chemical is expected to run out based on the current quantity remaining of the at least one chemical and on the at least one environmental parameter;
provide notification based on the time point; and
transmit a command concerning operation of the at least one vehicle wash facility from the at least one server computer to the vehicle wash facility based on the analysis.

12. The computer-readable medium of claim 11, further comprising instructions to cause a programmable processor to monitor at least one of a weather condition in proximity to the vehicle wash facility, information related to a composition of soil on one or more vehicles washed during operation of the vehicle wash facility and a temperature of one or more vehicles washed during operation of the vehicle wash facility.

13. The computer-readable medium of claim 11, further comprising instructions to cause a programmable processor to select, with the computer at the remote management facility based on the environmental parameter, one of a first chemical and a second chemical to be used during the operation of the vehicle wash facility.

14. The computer-readable medium of claim 11, further comprising instructions to cause a programmable processor to transmit a command from the computer at the remote management facility to the vehicle wash facility that controls an amount of a chemical applied during operation of the vehicle wash facility.

15. The computer-readable medium of claim 11, further comprising instructions to cause a programmable processor to transmit a command from the computer at the remote management facility to the vehicle wash facility that controls a temperature of water applied during operation of the vehicle wash facility.

16. The computer-readable medium of claim 11, further comprising instructions to cause a programmable processor to transmit a command from the computer at the remote management facility to the vehicle wash facility that controls a sequence in which chemicals are applied during operation of the vehicle wash facility.

17. The computer-readable medium of claim 11, further comprising instructions to cause a programmable processor to automatically analyze the at least one of the process data and the environmental parameter.

18. The computer-readable medium of claim 11, further comprising instructions to cause a programmable processor to analyze the at least one of the process data and the environmental parameter in response to an input from a user.

19. The computer-readable medium of claim 11, further comprising instructions to cause a programmable processor to transmit the least one environmental parameter and the process data to at least one of a chemical supplier, an equipment manufacturer and a service vehicle.

20. A method for remotely managing a vehicle wash process at a vehicle wash facility, wherein at least one chemical is applied to one or more vehicles during the vehicle wash process, the method comprising:
    receiving, at a client computer remotely located from the vehicle wash facility, vehicle wash process data from the vehicle wash facility, including receiving a current quantity remaining of at least one chemical product at the vehicle wash facility;
    receiving, at the client computer, an environmental parameter that influences application of the chemical to the vehicle during the vehicle wash process;
    analyzing, at the client computer, the vehicle wash process data and the environmental parameter;
    predicting, with the computer at the remote management facility, a time point indicating an expected time at which a supply of the at least one chemical is expected to run out based on the current quantity remaining of the at least one chemical and on the at least one environmental parameter;
    providing, from the computer at the remote management facility, a notification based on the time point; and
    transmitting a message from the client computer to the vehicle wash facility based on the analysis.

21. The method of claim 20, wherein receiving an environmental parameter comprises receiving a weather condition in proximity to the vehicle wash facility.

22. The method of claim 20, wherein receiving an environmental parameter comprises receiving information related to a composition of soil on the one or more vehicles.

23. The method of claim 20, wherein transmitting a message to the vehicle wash facility comprises transmitting a command specifying a task to be performed by the vehicle wash process.

24. The method of claim 23, wherein transmitting a command specifying a task to be performed by the vehicle wash process comprises transmitting a command requesting selection of a first chemical or a second chemical to be applied to the one or more vehicles during the vehicle wash process.

25. The method of claim 23, wherein transmitting a command specifying a task to be performed by the vehicle wash process comprises transmitting a command that requests a change in an amount of the at least one chemical applied to the one or more vehicles during the vehicle wash process.

26. The method of claim 23, wherein transmitting a command specifying a task to be performed by the vehicle wash process comprises transmitting a command that requests a change in temperature of water applied to the one or more vehicles during the vehicle wash process.

27. The method of claim 23, wherein transmitting a command specifying a task to be performed by the vehicle wash process comprises transmitting a command that requests a change in a sequence in which one or more chemicals are applied to the one or more vehicles during the vehicle wash process.

28. The method of claim 20, further comprising transmitting a message to a central management facility responsible for managing operations at the vehicle wash facility.

29. The method of claim 20, further comprising transmitting a message to a personal digital assistant.

* * * * *